US009455786B2

(12) United States Patent
Liao et al.

(10) Patent No.: US 9,455,786 B2
(45) Date of Patent: Sep. 27, 2016

(54) OPTICAL TRANSCEIVER

(71) Applicant: DELTA ELECTRONICS, INC., Taoyuan Hsien (TW)

(72) Inventors: Yu-Hsien Liao, Taoyuan Hsien (TW); Ming-Yi Huang, Taoyuan Hsien (TW); Te-Hsuan Yang, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 56 days.

(21) Appl. No.: 14/447,140

(22) Filed: Jul. 30, 2014

(65) Prior Publication Data
US 2015/0349893 A1 Dec. 3, 2015

(30) Foreign Application Priority Data
Nov. 29, 2013 (CN) .......................... 2013 1 0629341

(51) Int. Cl.
*H04B 10/00* (2013.01)
*H04B 10/43* (2013.01)
*G02B 6/42* (2006.01)
*H04B 10/25* (2013.01)

(52) U.S. Cl.
CPC ............. *H04B 10/43* (2013.01); *G02B 6/4243* (2013.01); *G02B 6/4246* (2013.01); *H04B 10/2503* (2013.01)

(58) Field of Classification Search
USPC .................................................. 398/135–139
See application file for complete search history.

(56) References Cited

U.S. PATENT DOCUMENTS

| 4,904,043 A * | 2/1990 | Schweizer ......... G02B 6/29362 385/35 |
| 5,082,344 A * | 1/1992 | Mulholland ......... G02B 6/3831 385/60 |
| 5,386,488 A * | 1/1995 | Oikawa ............... G02B 6/3835 385/92 |
| 5,500,911 A * | 3/1996 | Roff ....................... G02B 6/262 385/31 |
| 5,546,212 A * | 8/1996 | Kunikane ............ G02B 6/4246 385/33 |
| 5,663,821 A * | 9/1997 | Suda ................... G02B 6/4246 257/81 |
| 5,745,621 A * | 4/1998 | Musk ..................... G02B 6/327 385/53 |
| 5,841,562 A * | 11/1998 | Rangwala ............. H04B 10/40 385/92 |
| 5,852,694 A * | 12/1998 | Kimura ............... G02B 6/4296 385/78 |
| 5,883,748 A * | 3/1999 | Shum ................... G02B 6/4207 359/819 |

(Continued)

FOREIGN PATENT DOCUMENTS

CN 2705796 Y 6/2005

*Primary Examiner* — Agustin Bello
(74) *Attorney, Agent, or Firm* — Muncy, Geissler, Olds & Lowe, P.C.

(57) ABSTRACT

An optical transceiver includes a positioning element, a fiber connecting segment, a base and a housing. The positioning element has a first positioning part. The fiber connecting segment tightly fits to the positioning element. The housing supports at least one optical transceiving element and is connected to the positioning element. The base has a second positioning part and is configured for supporting the positioning element and the fiber connecting segment. The first positioning part and the second positioning part define the position of the fiber connecting segment.

15 Claims, 4 Drawing Sheets

(56) References Cited

U.S. PATENT DOCUMENTS

| | | | | |
|---|---|---|---|---|
| 6,010,251 | A * | 1/2000 | Koyanagi | G02B 6/4207 359/819 |
| 6,040,934 | A * | 3/2000 | Ogusu | G02B 6/4208 372/6 |
| 6,075,635 | A * | 6/2000 | Butrie | G02B 6/4246 385/24 |
| 6,179,483 | B1 * | 1/2001 | Kanazawa | G02B 6/4207 385/66 |
| 6,485,191 | B1 * | 11/2002 | Sato | G02B 6/4206 385/73 |
| 6,493,121 | B1 * | 12/2002 | Althaus | G02B 6/4246 398/135 |
| 6,654,517 | B2 * | 11/2003 | Fairchild | G02B 6/29365 385/16 |
| 6,720,582 | B2 * | 4/2004 | Miyokawa | G02B 6/4201 257/113 |
| 6,854,897 | B2 * | 2/2005 | Furumai | G02B 6/4246 385/73 |
| 6,877,913 | B2 * | 4/2005 | Goto | G02B 6/3636 385/88 |
| 6,916,120 | B2 * | 7/2005 | Zimmel | G02B 6/3843 385/78 |
| 7,004,646 | B2 * | 2/2006 | Ichihara | H04B 10/801 385/139 |
| 7,013,088 | B1 * | 3/2006 | Jiang | G02B 6/4204 385/88 |
| 7,086,787 | B2 * | 8/2006 | Okada | G02B 6/4214 385/88 |
| 7,215,885 | B2 * | 5/2007 | Yamane | G02B 6/29362 385/31 |
| 7,220,063 | B2 * | 5/2007 | Chung | G02B 6/3636 385/88 |
| 7,309,172 | B2 * | 12/2007 | Okada | G02B 6/4246 385/89 |
| 7,336,905 | B2 * | 2/2008 | Pyo | G02B 6/4246 385/27 |
| 7,403,716 | B2 * | 7/2008 | Lo | G02B 6/4246 385/88 |
| 7,585,120 | B2 * | 9/2009 | Ito | G02B 6/4227 385/50 |
| 7,670,063 | B2 * | 3/2010 | Ice | G02B 6/4246 385/76 |
| 7,708,471 | B2 * | 5/2010 | Ozeki | G02B 6/4246 385/37 |
| 7,712,971 | B2 * | 5/2010 | Lee | G02B 6/3858 385/62 |
| 7,824,113 | B2 * | 11/2010 | Wong | G02B 6/387 385/53 |
| 8,100,588 | B2 * | 1/2012 | Wong | G02B 6/387 385/53 |
| 8,113,723 | B2 * | 2/2012 | Togami | G02B 6/4246 385/53 |
| 8,160,452 | B1 * | 4/2012 | Tidwell | 398/138 |
| 8,292,518 | B2 * | 10/2012 | Togami | G02B 6/4246 385/53 |
| 8,340,481 | B2 * | 12/2012 | Levinson | G02B 6/4214 385/14 |
| 8,439,577 | B2 * | 5/2013 | Jenkins | G02B 6/381 385/60 |
| 2003/0118344 | A1 * | 6/2003 | Fujita | G02B 6/4206 398/139 |
| 2003/0215234 | A1 * | 11/2003 | Mine | G02B 6/4201 398/41 |
| 2004/0218857 | A1 * | 11/2004 | Hung | G02B 6/4246 385/31 |
| 2009/0162073 | A1 * | 6/2009 | Ojima | G02B 6/2835 398/139 |
| 2010/0215321 | A1 * | 8/2010 | Jenkins | G02B 6/381 385/78 |
| 2010/0226655 | A1 * | 9/2010 | Kim | G02B 6/4246 398/139 |

* cited by examiner

OPTICAL TRANSCEIVER

CROSS REFERENCE TO RELATED APPLICATIONS

This Non-provisional application claims priority under 35 U.S.C. §119(a) on Patent Application No(s). 201310629341.0 filed in People's Republic of China on Nov. 29, 2013, the entire contents of which are hereby incorporated by reference.

BACKGROUND OF THE INVENTION

1. Field of Invention

The present invention relates to an optical transceiver and, in particular, to an optical transceiver with more compact size.

2. Related Art

The optical communication technology provides a solution for fast and large amount of information transmission, so it has been used in more and more applications. In order to precisely transmit signals, the optical transceiver plays a critical role in the optical communication.

The optical transceiver is mainly used for receiving optical signals from the fiber and then converting the optical signals to electric signals or for converting electric signals to optical signals and then delivering the optical signals through the fiber. In general, the optical transceiver includes a transceiver and a fiber segment connecting to the transceiver. A fiber connector is configured at the end of the fiber segment for coupling to an external fiber and transmitting optical signals. However, since the fiber segment and the fiber connector are configured outside the transceiver, they certainly occupy additional space. When the available space is limited, the conventional optical transceiver is not quite suitable.

Therefore, it is an important subject to provide an optical transceiver having more compact size.

SUMMARY OF THE INVENTION

In view of the foregoing subject, an objective of the present invention is to provide an optical transceiver having more compact size.

To achieve the above objective, the present invention discloses an optical transceiver including a positioning element, a fiber connecting segment, a base and a housing. The positioning element has a first positioning part. The fiber connecting segment tightly fits to the positioning element. The housing supports at least one optical transceiving element and is connected to the positioning element. The base has a second positioning part and is configured for supporting the positioning element and the fiber connecting segment. The first positioning part and the second positioning part define the position of the fiber connecting segment.

In one embodiment, the fiber connecting segment has an end surface for connecting to an external fiber, and the normal direction of the end surface is not parallel to the center axis of the fiber connecting segment.

In one embodiment, an angle between the normal direction of the end surface and the center axis of the fiber connecting segment is 4±1 degrees, 8±1 degrees or 12±1 degrees.

In one embodiment, no additional fiber is configured between the positioning element and the housing.

In one embodiment, the base and the second positioning part are integrated as a single component.

In one embodiment, the fiber connecting segment at least includes a core and an encapsulating part covering the core, and the material of the encapsulating part includes metal, plastic, ceramic or glass.

In one embodiment, the positioning element is made of rigid material including metal, plastic, ceramic or glass.

In one embodiment, the optical transceiver further includes a connecting sleeve telescoping on the fiber connecting segment.

In one embodiment, the optical transceiver further includes a tube disposed between the connecting sleeve and the fiber connecting segment.

As mentioned above, the optical transceiver of the invention has a positioning element and a base for fixing the fiber connecting segment. Accordingly, when the end surface of the fiber connecting segment is not exactly perpendicular to the center axis of the fiber connecting segment, it is not shifted due to the assembling tolerance. Besides, the additional fiber segment for connecting to the external fiber is not necessary, thereby sufficiently minimizing the size of the optical transceiver.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
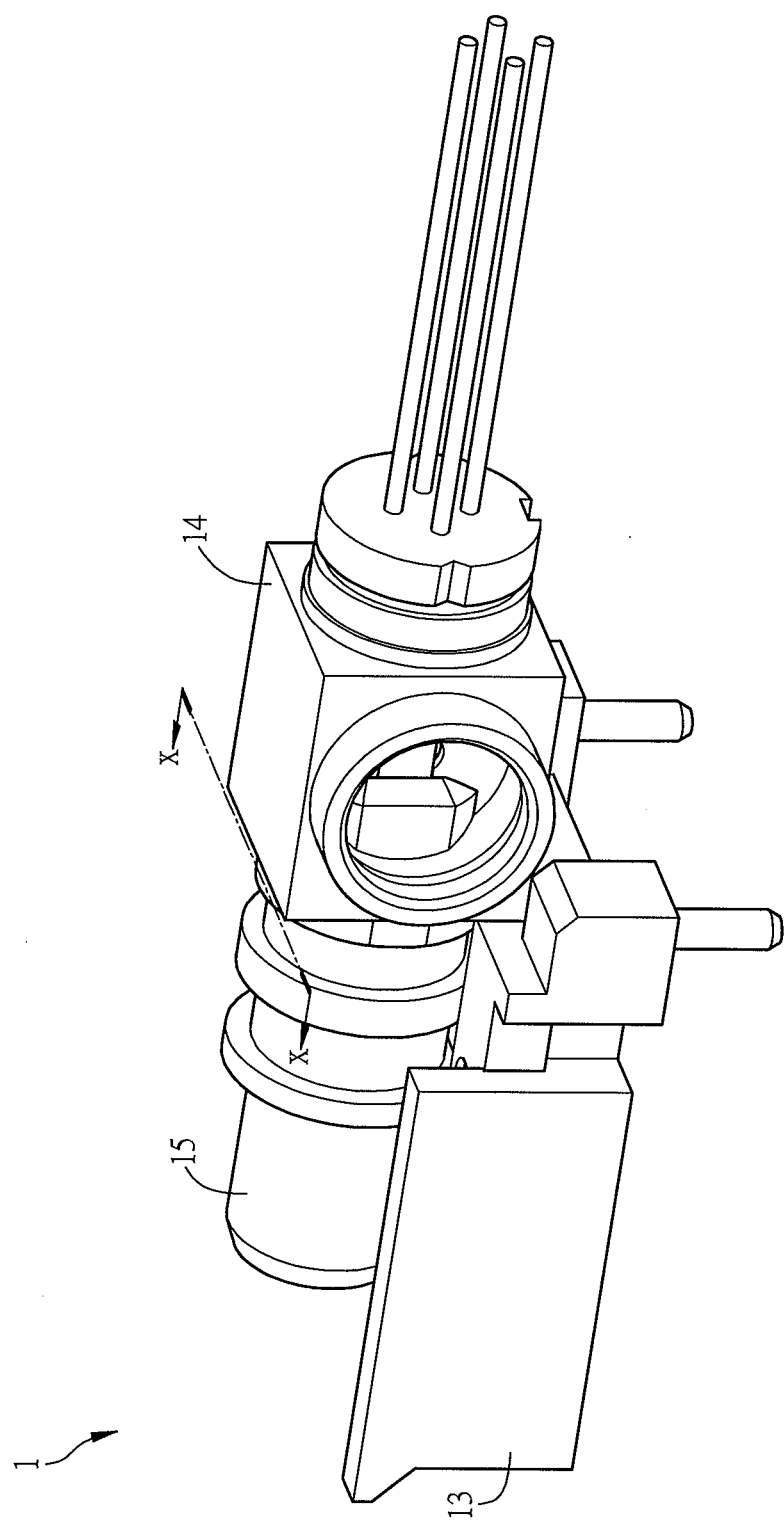
FIG. 1 is a schematic diagram showing an optical transceiver according to an embodiment of the invention.
Figure 2:
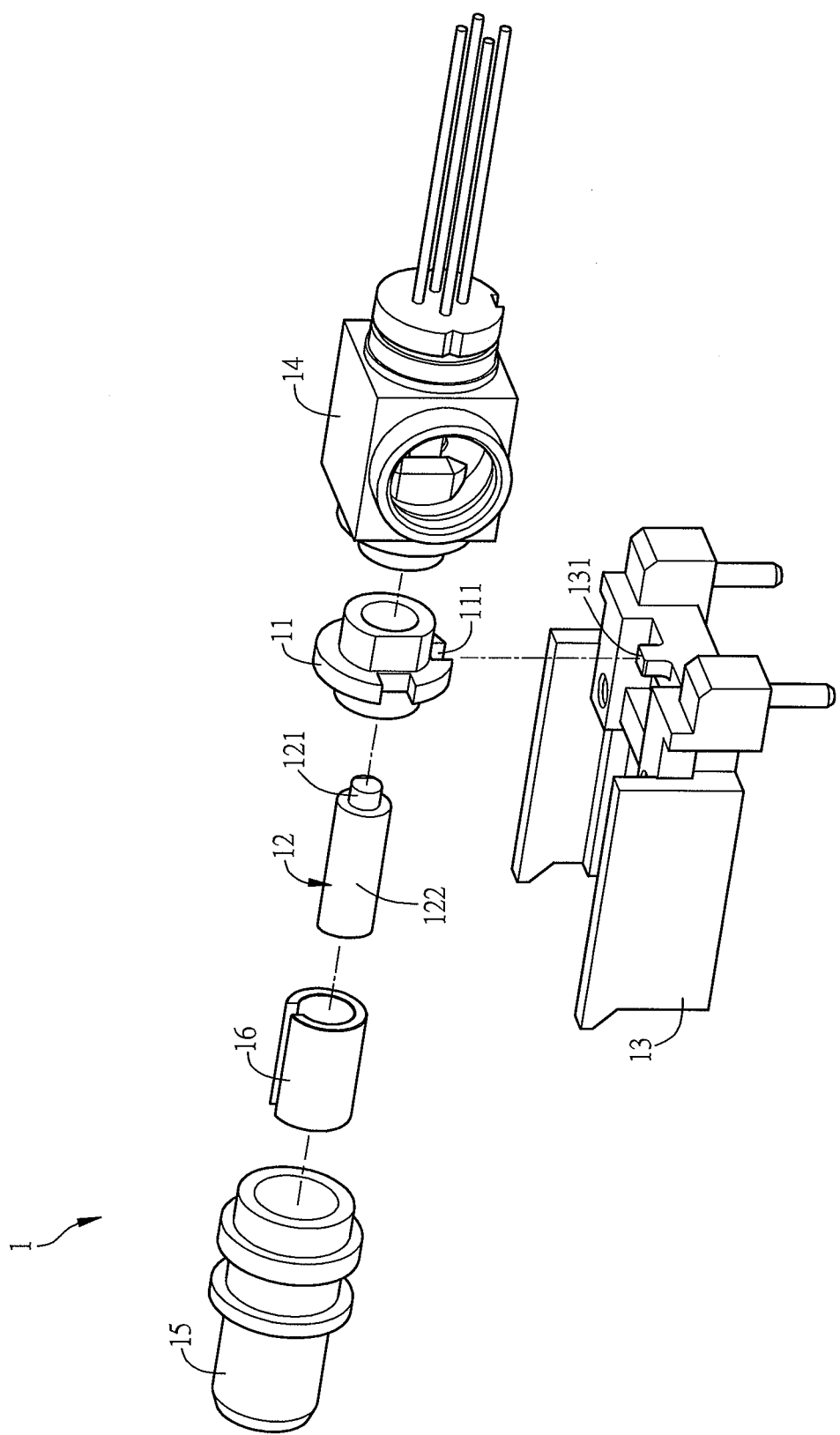
FIG. 2 is an exploded view of the optical transceiver of FIG. 1.

FIG. 1 is a schematic diagram showing an optical transceiver 1 according to an embodiment of the invention, and FIG. 2 is an exploded view of the optical transceiver 1 of FIG. 1. With reference to FIGS. 1 and 2, the optical transceiver 1 includes a positioning element 11, a fiber connecting segment 12, a base 13, and a housing 14. The fiber connecting segment 12 tightly fits to the positioning element 11. The positioning element 11, the fiber connecting segment 12 and the housing 14 are supported on a side surface of the base 13. The positioning element 11 has a first positioning part 111, while the base 13 has a second positioning part 131. The first positioning part 111 and the second positioning part 131 define and restrict the position of the fiber connecting segment 12, thereby improving the optical coupling degree between the fiber connecting segment 12 and the external fiber. The housing 14 supports at least one optical transceiving element 141 (see FIG. 4), which is used to perform the signal conversion between optical signals and electric signals. The positioning element 11 is connected to the housing 14. Since the optical transceiving element is well known in the art, the detailed description thereof will be omitted herein.

In addition, the optical transceiver 1 further includes a connecting sleeve 15 telescoping on the fiber connecting segment 12 for protecting and fixing the external fiber, thereby increasing the optical coupling degree.

In addition, the optical transceiver 1 further includes a tube 16 disposed between the connecting sleeve 15 and the fiber connecting segment 12 for precisely aligning the fiber connecting segment 12 to the external fiber, thereby further increasing the optical coupling degree.

Figure 3:
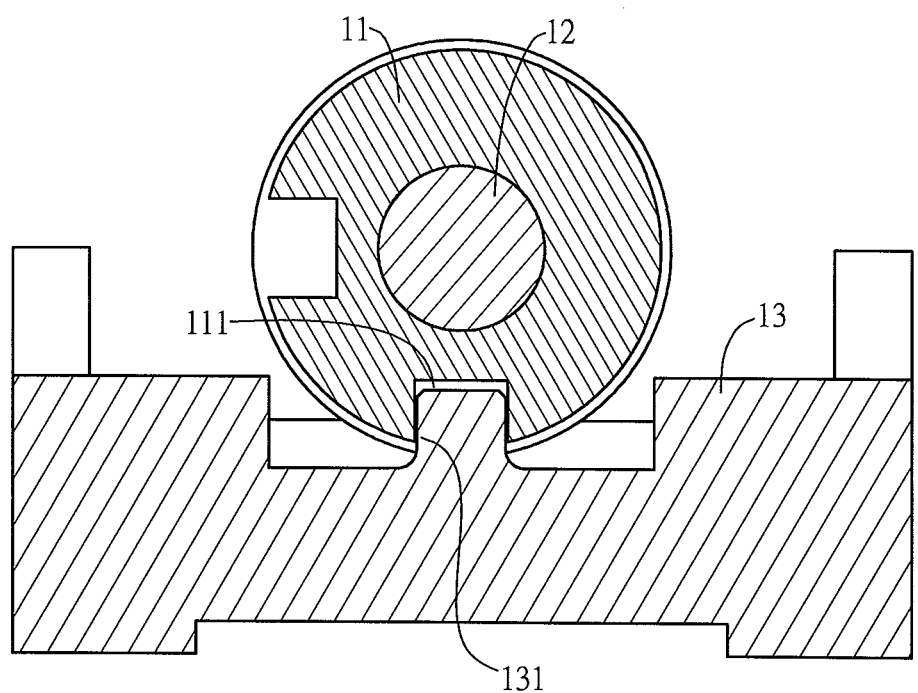
FIG. 3 is a sectional view of the optical transceiver of FIG. 1 along the line X-X.

FIG. 3 is a sectional view of the optical transceiver 1 of FIG. 1 along the line X-X. Referring to FIG. 3, the first positioning part 111 is a recess formed on the positioning element 11, while the second positioning part 131 is a protrusion formed on the base 13. According to the design of the recess and protrusion, the position of the fiber connecting segment 12 can be defined, so that the relative rotation or displacement of the fiber connecting segment 12 and the positioning element 11 can be avoided, thereby further increasing the optical coupling degree.

In another embodiment, the first positioning part 111 is a protrusion, while the second positioning part 131 is a recess. In this invention, the positioning method of the first positioning part 111 and the second positioning part 131 is, for example but not limited to, fitting, connecting by corresponding shapes, wedging, screwing, locking, attaching or bolting. In addition, the positioning element 11 and the base 13 can be relatively positioned based on their corresponding structures and shapes, thereby exactly defining the position of the fiber connecting segment 12.

In another embodiment, the base 13 and the second positioning part 131 can be integrally formed as a single component so as to simplify the manufacturing process.

In addition, the fiber connecting segment 12 may at least include a core 121 and an encapsulating part 122 covering the core 121. The material of the encapsulating part 122 includes metal, plastic, ceramic or glass. Besides, the positioning element 11 can be made of rigid material including metal, plastic, ceramic or glass, so that it can be welded to the base 13.

Figure 4:
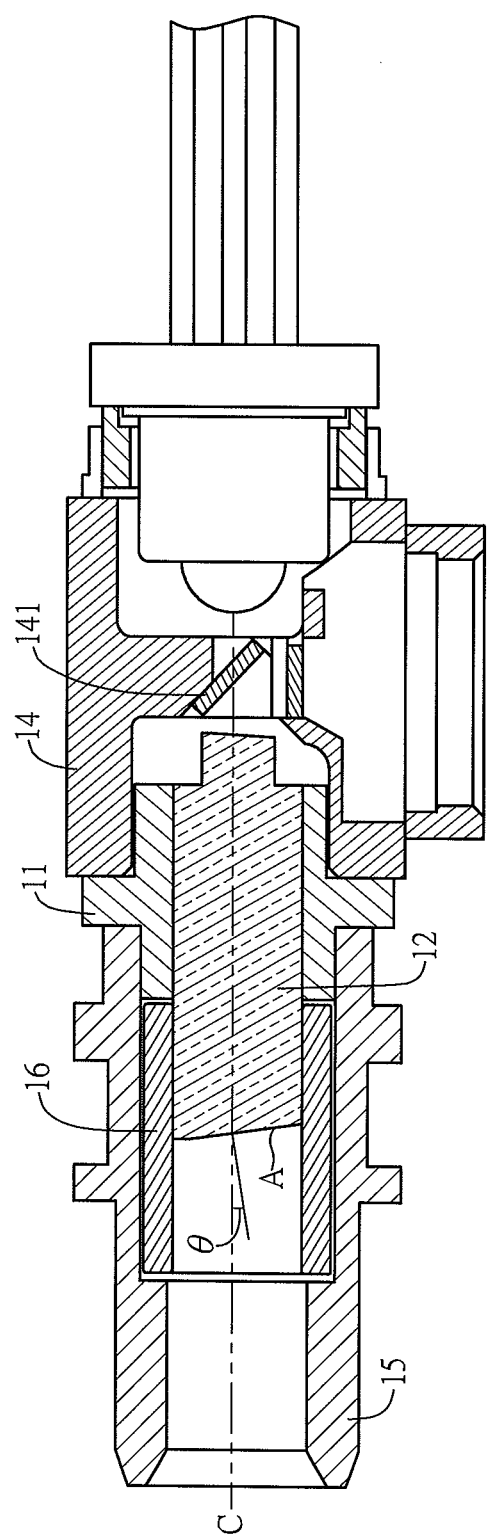
FIG. 4 is a sectional top view of a part of the optical transceiver of FIG. 1.

FIG. 4 is a sectional top view of a part of the optical transceiver 1 of FIG. 1. To be noted and clearly illustration, the base 13 is not shown in FIG. 4. With reference to FIG. 4, the fiber connecting segment 12 has an end surface A configured for connecting to the external fiber. Herein, the normal direction of the end surface A is not parallel to the center axis C of the fiber connecting segment 12. In this embodiment, the angle θ between the normal direction of the end surface A and the center axis C of the fiber connecting segment 12 can be 4±1 degrees, 8±1 degrees or 12±1 degrees. Due to the configuration of the angle θ between the normal direction of the end surface A and the center axis C, the route of the reflected optical signal from the end surface A is not overlapped with the incident optical signal. This can avoid the undesired interference of the incident and reflected optical signals, thereby improving the light transmission quality.

To be noted, the above-mentioned fiber connecting segment 12 is tightly fitted to the positioning element 11, and the first positioning part 111 of the positioning element 11 and the second positioning part 131 of the base 13 are configured to fix the direction of the end surface A of the fiber connecting segment 12. This design can prevent the shift of the end surface A due to the assembling tolerance, so that the external fiber can precisely connect to the fiber connecting segment 12, thereby increasing the optical coupling degree.

To be noted, the fiber connecting segment 12 may not be inserted into the housing 14, while the major consideration is to properly transmit the optical signals between the fiber connecting segment 12 and the housing 14. In this embodiment, the fiber connecting segment 12 is partially inserted into the housing 14, but this invention is not limited thereto.

The optical transceiver 1 can be accommodated within a metal case (not shown) for preventing electromagnetic interference and thus improving the light transmission quality.

In summary, the optical transceiver of the invention has a positioning element and a base for fixing the fiber connecting segment. Accordingly, when the end surface of the fiber connecting segment is not exactly perpendicular to the center axis of the fiber connecting segment, it is not shifted due to the assembling tolerance. Besides, the additional fiber segment for connecting to the external fiber is not necessary, thereby sufficiently minimizing the size of the optical transceiver.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. An optical transceiver, comprising:
   a positioning element having a first positioning part;
   a fiber connecting segment tightly fitting to the positioning element;
   a base having a second positioning part and supporting the positioning element and the fiber connecting segment, wherein the first positioning part and the second positioning part define the position of the fiber connecting segment; and
   a housing connected to the positioning element and configured for supporting at least one optical transceiving element,
   wherein the first positioning part is a recess formed on the positioning element, the second positioning part is a protrusion formed on the base, and the second positioning part is disposed within the first positioning part.

2. The optical transceiver of claim 1, wherein the fiber connecting segment has an end surface for connecting to an external fiber, and the normal direction of the end surface is not parallel to the center axis of the fiber connecting segment.

3. The optical transceiver of claim 2, wherein an angle between the normal direction of the end surface and the center axis of the fiber connecting segment is 4±1 degrees, 8±1 degrees or 12±1 degrees.

4. The optical transceiver of claim 1, wherein no additional fiber is configured between the positioning element and the housing.

5. The optical transceiver of claim 2, wherein no additional fiber is configured between the positioning element and the housing.

6. The optical transceiver of claim 1, wherein the base and the second positioning part are integrated as a single component.

7. The optical transceiver of claim 2, wherein the base and the second positioning part are integrated as a single component.

8. The optical transceiver of claim 1, wherein the fiber connecting segment at least comprises a core and an encapsulating part covering the core, and the material of the encapsulating part comprises metal, plastic, ceramic or glass.

9. The optical transceiver of claim 2, wherein the fiber connecting segment at least comprises a core and an encapsulating part covering the core, and the material of the encapsulating part comprises metal, plastic, ceramic or glass.

10. The optical transceiver of claim 1, wherein the material of the positioning element comprises metal, plastic, ceramic or glass.

11. The optical transceiver of claim 2, wherein the material of the positioning element comprises metal, plastic, ceramic or glass.

12. The optical transceiver of claim 1, further comprising:
   a connecting sleeve telescoping on the fiber connecting segment.

13. The optical transceiver of claim 12, further comprising:
   a tube disposed between the connecting sleeve and the fiber connecting segment.

14. The optical transceiver of claim 2, further comprising:
   a connecting sleeve telescoping on the fiber connecting segment.

15. The optical transceiver of claim 14, further comprising:
   a tube disposed between the connecting sleeve and the fiber connecting segment.

\* \* \* \* \*